(12) United States Patent
Dauscher

(10) Patent No.: US 11,920,490 B2
(45) Date of Patent: Mar. 5, 2024

(54) CHARGING DEVICE WITH THRUST BEARING

(71) Applicant: BorgWarner Inc., Auburn Hills, MI (US)

(72) Inventor: Sebastian Dauscher, Immesheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/947,304

(22) Filed: Sep. 19, 2022

(65) Prior Publication Data
US 2024/0035395 A1    Feb. 1, 2024

(30) Foreign Application Priority Data
Jul. 27, 2022  (DE) ................ 20 2022 104 248.9

(51) Int. Cl.
*F01D 25/16*  (2006.01)
*F01D 25/24*  (2006.01)
*F16C 17/04*  (2006.01)

(52) U.S. Cl.
CPC ........... *F01D 25/166* (2013.01); *F01D 25/24* (2013.01); *F16C 17/04* (2013.01); *F05D 2220/40* (2013.01); *F16C 2360/24* (2013.01)

(58) Field of Classification Search
CPC ........ F01D 25/166; F01D 25/24; F16C 17/04; F16C 2360/24; F05D 2220/40
See application file for complete search history.

(56) References Cited

U.S. PATENT DOCUMENTS

| 4,725,206 A * | 2/1988 | Glaser ................ F02B 39/005 |
| | | 417/407 |
| 2011/0255963 A1* | 10/2011 | Kim .................... F04D 29/0513 |
| | | 415/211.2 |

(Continued)

FOREIGN PATENT DOCUMENTS

| CN | 112503025 A | 3/2021 |
| DE | 102018201162 A1 | 7/2019 |

OTHER PUBLICATIONS

German Search Report dated Mar. 27, 2023, in German Application No. 20 2022 104 248.9.

*Primary Examiner* — Audrey B. Walter
(74) *Attorney, Agent, or Firm* — Eric L. Doyle; Stephan A. Pendorf; Patent Central LLC

(57) ABSTRACT

A charging device (10) for an internal combustion engine or a fuel cell, including a compressor (100) with a compressor housing (110) and a compressor wheel (120) arranged therein. The charging device (10) also includes a shaft (200) which is coupled to the compressor wheel (120), and a bearing housing (300) which is connected to the compressor housing and in which the shaft (200) is rotatably mounted. The bearing housing (300) includes a thrust bearing (400) for axial mounting of the shaft (200). The thrust bearing (400) has a bearing gap (410) which extends at least partially in a radial direction (24) relative to the shaft (200). The thrust bearing (400) is fluidically connected to the compressor (100) and arranged such that when the compressor (100) is in operation, a fluid stream from the compressor (100) flows at least partially in the radial direction (24) through the bearing gap (410). The thrust bearing (400) is fluidically connected to a pressure side (130) of the compressor (100).

15 Claims, 3 Drawing Sheets

(56) References Cited

U.S. PATENT DOCUMENTS

| 2012/0219439 | A2 | 8/2012 | Takado et al. |
| 2020/0347780 | A1 | 11/2020 | Wengert et al. |
| 2020/0378276 | A1* | 12/2020 | Ikeya .................. F01D 25/16 |
| 2023/0049251 | A1 | 2/2023 | Niu et al. |

* cited by examiner

CHARGING DEVICE WITH THRUST BEARING

TECHNICAL FIELD

The present invention concerns a charging device for an internal combustion engine or a fuel cell.

BACKGROUND

Ever more vehicles of the newer generation are being equipped with charging devices in order to meet requirement objectives and fulfil legal conditions. In the development of charging devices, the reliability and efficiency of both the individual components and the system as a whole must be optimized.

Known charging devices usually comprise at least a compressor with a compressor wheel which is connected to a drive unit via a common shaft. The compressor compresses the fresh air which is drawn in for the internal combustion engine or the fuel cell. In this way, the quantity of air or oxygen available to the engine for combustion, or to the fuel cell for reaction, is increased. This in turn leads to a power increase of the internal combustion engine or fuel cell. Charging devices may be equipped with various drive units. In the prior art, in particular, electric chargers are known in which the compressor is driven via an electric motor, and also exhaust gas turbochargers in which the compressor is driven via an exhaust gas turbine. Combinations of the two systems are also described in the prior art.

In the prior art, the system of compressor wheel, shaft and drive unit is normally mounted in a bearing housing via radial and axial bearing arrangements. During operation of the compressor, axial forces may be transmitted to the shaft which act in the axial direction, in particular towards the compressor wheel when viewed from the bearing housing. These axial forces must be compensated by compensation forces or bearing forces for axial mounting of the shaft in the thrust bearing. Known systems frequently lead to an increased requirement for installation space and design restrictions.

The object of the present invention is to provide a charging device which has an improved axial mounting.

SUMMARY OF THE INVENTION

The present invention concerns a charging device for an internal combustion engine or a fuel cell according to patent claim 1. The dependent patent claims disclose advantageous embodiments of the charging device.

The charging device for an internal combustion engine or a fuel cell comprises a compressor with a compressor housing and compressor wheel arranged therein. The charging device also comprises a shaft which is coupled to the compressor wheel, and a bearing housing which is connected to the compressor housing and in which the shaft is rotatably mounted. The bearing housing comprises a thrust bearing for axial mounting of the shaft. The thrust bearing has a bearing gap which extends at least partially in a radial direction relative to the shaft. The thrust bearing is fluidically connected to the compressor and arranged such that when the compressor is in operation, a fluid stream from the compressor flows at least partially in the radial direction through the bearing gap. The thrust bearing is fluidically connected to a pressure side of the compressor. In other words, the thrust bearing is arranged such that the fluid flow is discharged in the radial direction through the bearing gap.

Using the charging device according to the invention, an axial load on the thrust bearing can be reduced. This may lead to lower wear in the thrust bearing. Also, the thrust bearing may be dimensioned smaller. Also, the fluid stream may provide a cooling of the thrust bearing.

In some embodiments, the thrust bearing may be an axial air bearing. The fluid stream may be a leakage air stream. The compressor may be a radial compressor. During operation of the compressor or rotation of the compressor wheel, axial forces may be transmitted to the shaft which act in the axial direction of the shaft (or parallel to the shaft axis), in particular towards the compressor wheel when viewed from the bearing housing. These axial forces must be compensated by compensation forces or bearing forces acting in the axial direction for axial mounting of the shaft in the thrust bearing. These bearing forces may be directed opposite to the axial forces. This may be achieved by provision of an air bearing in the thrust bearing, in which an air film is built up between the bearing partners and compensates for the acting axial forces. Because of the high pressure level in the compressor housing (in particular on the pressure side of the compressor or downstream of the compressor wheel), the fluid stream, in particular the leakage stream, behind the compressor wheel may occur between the shaft and housing part (e.g. the compressor rear wall). The thrust bearing is here arranged such that this leakage air stream is conducted to the bearing gap of the thrust bearing. Because the leakage air stream flows at least partially in the radial direction and is discharged through the bearing gap of the thrust bearing, the acting axial forces can be compensated more easily since compensation forces can also be generated by the creation of an air film by the leakage air stream. An axial load on the bearing can thereby be reduced. This may lead to reduced wear in the thrust bearing. Also, the thrust bearing may be dimensioned smaller. Also, a cooling of the thrust bearing may be provided by the leakage air stream.

In some embodiments, the bearing gap of the thrust bearing may be fluidically connected to the pressure side of the compressor. In particular, the pressure side of the compressor is situated at a position downstream of the compressor wheel.

In some embodiments, the thrust bearing may be formed between the compressor wheel and the bearing housing. The compressor housing may comprise a compressor rear wall. In some embodiments, the thrust bearing may be arranged in the axial direction between the compressor housing and the bearing housing. In particular, the thrust bearing may be arranged in the axial direction between the compressor rear wall and the bearing housing. The compressor rear wall may be arranged in the axial direction between the compressor wheel and the thrust bearing.

In some embodiments, the thrust bearing may comprise a thrust bearing plate which is rotationally fixedly coupled to the shaft. Also, the thrust bearing may have a thrust bearing chamber in which the thrust bearing plate is arranged. In some embodiments, the bearing gap may extend between the thrust bearing plate and the compressor rear wall.

In some embodiments, the thrust bearing plate may have a first running surface which extends substantially orthogonally to the axis of the shaft and faces the compressor wheel. The thrust bearing plate may have a second running surface, opposite the first running surface, which runs substantially parallel to the first running surface and faces away from the compressor wheel.

In some embodiments, the bearing gap may extend between the first running surface and the compressor rear wall. In particular, the leakage air stream in the bearing gap may thus flow in the radial direction between the first running surface and the compressor rear wall, so that the an air film is built up between these two components by the leakage air stream, which may lead to a reduction in thrust bearing loads.

In some embodiments, the thrust bearing may have at least one first bearing film and/or a second bearing film. The first bearing film and the second bearing film may be arranged lying directly next to one another in the axial direction. In some embodiments, the first bearing film may be arranged directly next to the compressor rear wall, and the second bearing film may be arranged in the axial direction next to the thrust bearing plate, in particular next to the first running surface.

The first bearing film may be designed to preload the second bearing film in the axial direction against the thrust bearing plate. In some embodiments, the first bearing film may be designed to be elastically compressible in the axial direction between the second bearing film and the compressor rear wall by a movement of the second bearing film.

In some embodiments, during operation, the bearing gap may be formed in the axial direction between the thrust bearing plate, in particular the first running surface, and the second bearing film.

In some embodiments, the thrust bearing plate may comprise a circumferential running surface which extends between the first running surface and the second running surface. In particular, the thrust bearing plate may have a first radius measured in the radial direction between the shaft axis and the circumferential running surface.

In some embodiments, the bearing gap may extend in the radial direction in a region in which the compressor rear wall lies opposite the first running surface. In particular, the bearing gap may extend in the radial direction up to the circumferential running surface.

The thrust bearing chamber may have an inner circumferential face with a second radius, measured in the radial direction between the shaft axis and the inner circumferential face. In some embodiments, the first radius may be smaller than the second radius. In some embodiments, the first radius may be smaller than a third radius of the compressor wheel, measured in the radial direction between a shaft axis and an outer circumference of the compressor wheel.

The compressor rear wall may have a cylindrical passage in which the shaft is arranged with a spacing in the radial direction.

The charging device may furthermore comprise at least one supply channel which fluidically connects the thrust bearing, in particular the bearing gap, to the pressure side of the compressor.

Also, the charging device may furthermore comprise at least one return channel which is designed to discharge the fluid stream, flowing through the bearing gap in the radial direction during operation of the compressor, out of the thrust bearing, in particular out of the bearing gap. In some embodiments, a first pressure in the supply channel may be greater than a second pressure in the return channel. This may ensure that the fluid stream flows through the bearing gap.

In some embodiments, the supply channel may have a supply channel inlet which is arranged at a position between the compressor wheel and the compressor rear wall. Also, the supply channel may have a supply channel outlet which opens into the bearing gap.

In some embodiments, the supply channel may be configured such that the fluid stream is conducted from the pressure side of the compressor, in particular from the supply channel inlet, substantially in the radial direction towards the shaft and/or in the axial direction to the bearing gap, in particular to the supply channel outlet. In some embodiments, the supply channel may have an axial supply channel portion which extends, starting from the bearing gap, substantially in the axial direction, in particular towards the compressor wheel, through the compressor rear wall and/or between the shaft and the compressor rear wall.

In some embodiments, the supply channel may have a radial supply channel portion which extends, starting from the axial supply channel portion, substantially in the radial direction in the compressor rear wall to the supply channel inlet.

The compressor housing may comprise a compressor inlet.

In some embodiments, the return channel may fluidically connect the thrust bearing, in particular the bearing gap, to the compressor inlet. The return channel may be designed such that the fluid stream, flowing through the bearing gap in the radial direction during operation of the compressor, is conducted to the compressor inlet.

In some embodiments, the charging device may furthermore comprise a fuel cell. In an embodiment, the return channel may fluidically connect the thrust bearing, in particular the bearing gap, to the fuel cell. The return channel may here be designed such that the fluid stream, flowing through the bearing gap in the radial direction during operation of the compressor, is conducted to the fuel cell.

Alternatively to the fuel cell, the charging device may furthermore comprise a turbine which has a turbine casing with a turbine wheel arranged therein, and a turbine casing outlet. In an embodiment, the return channel may fluidically connect the thrust bearing, in particular the bearing gap, to the turbine casing outlet. The return channel may here be designed such that the fluid stream, flowing through the bearing gap in the radial direction during operation of the compressor, is conducted to the turbine casing outlet.

In some embodiments, the return channel may have a return channel inlet which is fluidically connected to the bearing gap and/or the thrust bearing chamber.

In some embodiments, the return channel may have a return channel outlet which is connected to the compressor inlet.

In some embodiments, the return channel may be arranged at least in portions in the bearing housing and/or in the compressor housing. In addition or alternatively, the return channel may be arranged at least in portions in an external line element.

The return channel may comprise a valve element which can be moved between a closed position in which the return channel is closed, and an open position in which the return channel is at least partially open.

In some embodiments, the return channel inlet may be arranged radially outside the thrust bearing plate in the radial direction. In particular, the return channel inlet may be arranged on the inner circumferential face of the thrust bearing chamber.

In some embodiments, a sealing element may be arranged between the thrust bearing plate and the inner circumferential face. In particular, the sealing element may be a labyrinth seal.

In some embodiments, the return channel inlet may be arranged on the inner circumferential face, in the axial direction next to the compressor rear wall. In particular, the return channel inlet may be arranged on the inner circumferential face, in the axial direction at least partially between the compressor rear wall and the thrust bearing plate.

Alternatively, the return channel inlet may be arranged on the inner circumferential face, in the axial direction next to a wall portion of the bearing housing which lies opposite the second running surface. In particular, the return channel inlet may be arranged on the inner circumferential face, in the axial direction at least partially between the wall portion and the thrust bearing plate.

Alternatively, the return channel inlet may be arranged on the inner circumferential face, in the axial direction substantially centrally between the compressor rear wall and the wall portion.

Alternatively or additionally, the return channel inlet may be arranged on the inner circumferential face, in the axial direction substantially opposite the circumferential running surface. In some embodiments, the return channel inlet may be arranged in the sealing element.

In some embodiments, the return channel outlet may open into the compressor inlet orthogonally to the axial direction. Alternatively, the return channel outlet may open into the compressor inlet at an angle β<90° between a channel axis of the return channel and the axial direction.

In some embodiments, the compressor housing may have a compressor outlet with a compressor volute. The compressor inlet may have an inlet portion and a casing portion. In addition, a return chamber may extend between the casing portion and the compressor housing and/or the inlet portion. The return chamber may extend from a chamber inlet, which is arranged axially between the casing portion and the compressor housing, to a chamber outlet, which is arranged axially between the casing portion and the inlet portion. In some embodiments, the return channel outlet may open into the return chamber.

In some embodiments, the charging device may furthermore comprise a drive unit, wherein the compressor wheel is connected to the drive unit via the shaft. In some embodiments, the drive unit may comprise a turbine and/or an electric motor.

The electric motor may be arranged in a motor chamber in the bearing housing. In some embodiments, the electric motor may have a rotor and a stator. In particular, the rotor may be arranged on the shaft, and the stator may surround the rotor.

The charging device may furthermore comprise a power electronics circuit for controlling the electric motor, which is arranged in a receiving chamber in the bearing housing.

In some embodiments, the bearing housing may comprise a radial bearing arrangement for radial mounting of the shaft.

DETAILED DESCRIPTION

Figure 1:
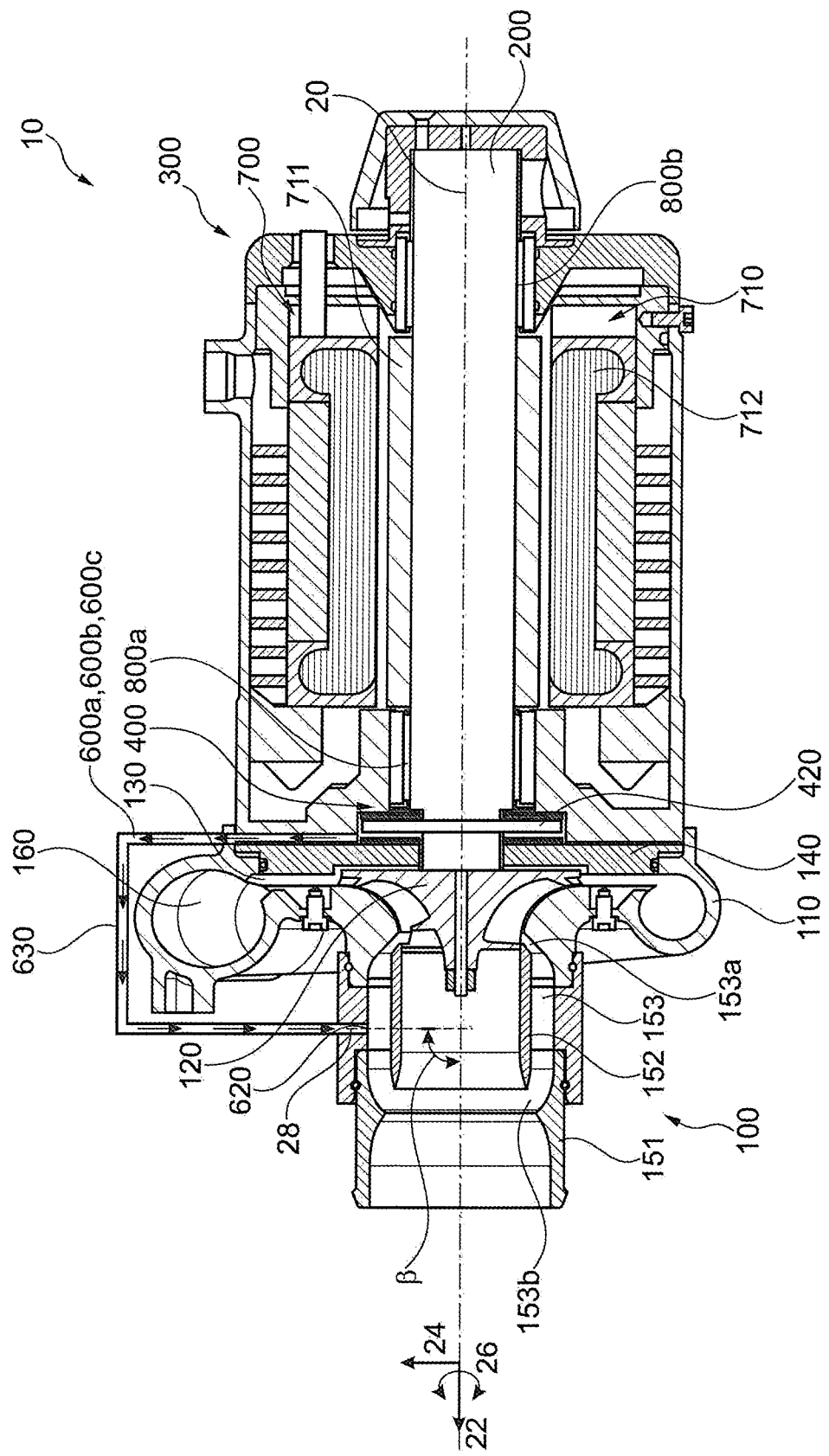
FIG. 1 shows a side sectional view of the charging device with a schematically illustrated thrust bearing according to the invention.

In the context of this application, the expressions "axial" and "axial direction" relate to an axis 20 of the shaft 200.

With reference to the Figures (see e.g. FIGS. 1 to 5), the axial direction is marked with reference sign 22. A radial direction 24 also relates to the axial direction 22. Similarly, a circumference or circumferential direction 26 relates to the axial direction 22. The directions 22 and 24 run orthogonally to one another.

FIG. 1 shows a charging device 10 for an internal combustion engine or a fuel cell. The charging device 10 comprises a compressor 100 with a compressor housing 110 and a compressor wheel 120 arranged therein. Furthermore, the charging device 10 comprises a shaft 200 which is rotationally fixedly connected to the compressor wheel 120. A bearing housing 300 is connected to the compressor housing 100. The shaft 200 is rotatably mounted in the bearing housing 300. The bearing housing contains a thrust bearing 400 for axial mounting of the shaft 200, and a radial bearing arrangement 800a, 800b for radial mounting of the shaft 200. The radial bearing arrangement is arranged in the bearing housing 300 and comprises a first radial bearing 800a and a second radial bearing 800b. The first radial bearing 800a and the second radial bearing 800b are spaced apart from one another in the axial direction 22. The charging device 10 comprises a drive unit 700, wherein the compressor wheel 120 is connected to the drive unit 700 via the shaft 200. As shown in FIG. 1, the drive unit 700 comprises an electric motor 710. Alternatively or additionally, the drive unit 700 may comprise a turbine (not shown in the Figures). The turbine may have a turbine casing with a turbine wheel arranged therein, and a turbine casing outlet. The shaft 200 may be rotationally fixedly coupled to the turbine wheel at an end of the shaft 200 opposite the compressor wheel 120. The electric motor 710 is arranged in a motor chamber in the bearing housing 300. The electric motor 710 has a rotor 711 and a stator 712, in particular wherein the rotor 711 is arranged on the shaft 200 and wherein the stator 712 surrounds the rotor 711. The charging device 10 may furthermore comprise a power electronics circuit for controlling the electric motor 710, which is arranged in a receiving chamber in the bearing housing 300.

The compressor housing 110 comprises a compressor inlet 150, a compressor outlet 160 and a compressor volute. In an embodiment as shown in FIG. 1, the compressor inlet 150 may comprise an inlet portion 151 and a casing portion 152, wherein a return chamber 153 extends between the casing portion 152 and the compressor housing 110 and/or the inlet portion 151. The return chamber 153 here extends from a chamber inlet 153a, which is arranged axially between the casing portion 152 and the compressor housing 110, to a chamber outlet 153b which is arranged axially between the casing portion 152 and the inlet portion 151.

Figure 2:
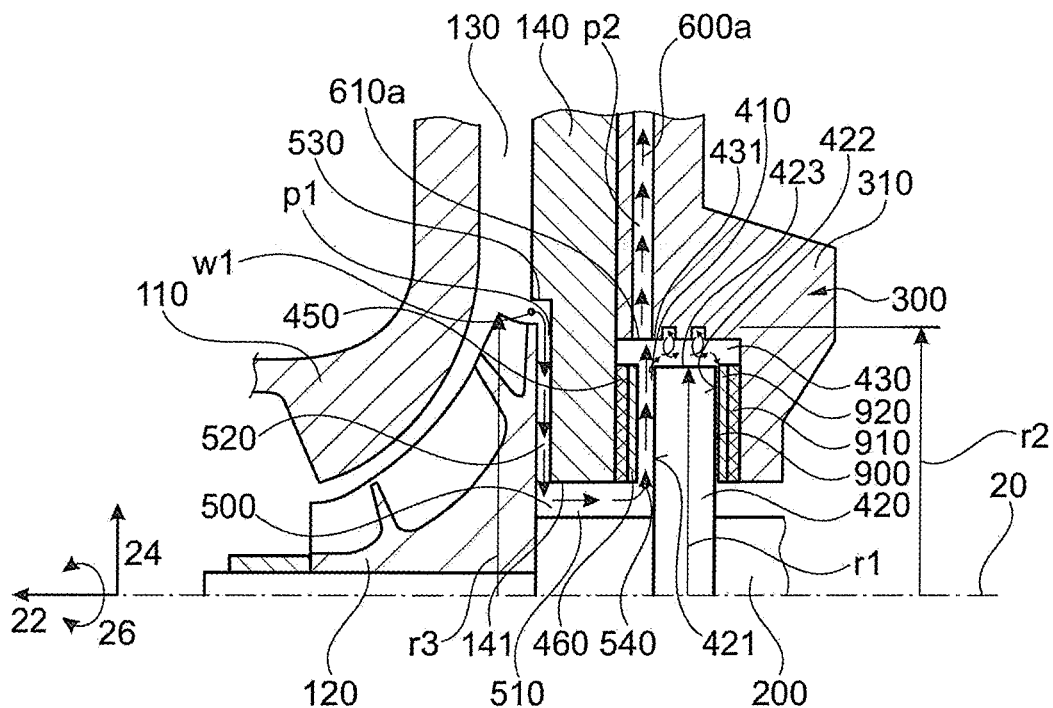
FIG. 2 shows a more detailed side sectional view of the thrust bearing according to a first embodiment.

FIGS. 2 to 5 show more detailed side sectional views of the thrust bearing 400 in several embodiments. The thrust bearing 400 has a bearing gap 410 which extends at least partially in a radial direction 24 with respect to the shaft 200. As shown in FIG. 2 for example, the bearing gap 410 may also extend continuously in the radial direction 24. The thrust bearing 400 is fluidically connected to the compressor 100 and arranged such that when the compressor 100 is in operation, a fluid stream from the compressor 100 flows at least partially in the radial direction 24 through the bearing gap 410. In other words, a fluid stream, in particular a leakage air stream which flows from the pressure side 130 of the compressor 100 to the bearing gap 410 during operation of the compressor 100, is conducted through the bearing gap 410 in the radial direction 24. The fluid stream is illustrated by arrows in FIGS. 2 to 5. In particular, the thrust bearing 400 is fluidically connected to a pressure side 130 of the compressor 100. More precisely, a pressure side 130 of the compressor 100 may be defined as a position which is situated downstream of the compressor wheel 120. This position may in particular be situated downstream of a trailing edge and/or directly on a trailing edge of a blade of the compressor wheel 120. The compressor wheel has several blades arranged in the circumferential direction 26, each of which have a leading edge and a trailing edge. The leading edge is oriented substantially upstream of the compressor wheel, i.e. towards an inlet cross-section of the compressor inlet 150 and an inflowing fluid stream. As FIG. 1 shows, the compressor 100 is a radial compressor.

The fluid stream is a leakage air stream. The bearing gap 410 of the thrust bearing 400 is fluidically connected to the pressure side 130 of the compressor 100. As illustrated in FIGS. 2 to 5, the thrust bearing 400 is an axial air bearing. The thrust bearing 400 is arranged such that the leakage air stream is discharged in the radial direction 24 through the bearing gap 410. During operation of the compressor 100 and compressor wheel 120, axial forces which act in the axial direction 22 (or parallel to the shaft axis 20), in particular towards the compressor wheel 120 when viewed from the bearing housing 300, are transmitted to the shaft 200. These axial forces must be compensated by compensation forces or bearing forces for axial mounting of the shaft 200 in the thrust bearing 400. This may be achieved by providing an air bearing in the thrust bearing 400, in which an air film is built up between the bearing partners and compensates for the acting axial forces. Because of the high pressure level in the compressor housing 110 (in particular downstream of the compressor wheel 120), a leakage air stream may occur behind the compressor wheel 120 between the shaft 200 and housing parts (for example, a compressor rear wall 140). The thrust bearing 400 is here arranged such that this leakage air stream can enter a bearing gap 410 of the thrust bearing 400. Because the leakage air stream flows through the bearing gap 410 of the thrust bearing 400 and is discharged in the radial direction 24, the acting axial forces can be compensated more easily, since compensation forces can also be created by the build-up of an air film by the leakage air stream. In this way, an axial load on the bearing 400 may be reduced. This may lead to reduced wear in the thrust bearing 400. Also, the thrust bearing 400 may be dimensioned smaller. Also, the leakage air stream may provide a cooling of the thrust bearing 400. The proportion of the leakage air stream in the total compressed fluid stream on the pressure side 130 of the compressor 100 may amount to 1% or more. In some embodiments, the proportion may amount to between 1% and 10%. In other embodiments, the proportion may be between 1% and 7% or more. The proportion of the leakage air stream may be dependent on the respective operating point of the compressor 100.

As FIGS. 2 to 5 show, the thrust bearing 400 is formed in the axial direction 22 between the compressor wheel 120 and the bearing housing 300. The compressor housing 110 comprises a compressor rear wall 140. The compressor rear wall is connected to the compressor housing 110 and/or the bearing housing 300. The thrust bearing 400 is arranged in the axial direction 22 between the compressor rear wall 140 and the bearing housing 300. In other words, the compressor rear wall 140 is arranged in the axial direction 22 between the compressor wheel 120 and the thrust bearing 400. The compressor rear wall 140 comprises a cylindrical passage 141 in which the shaft 200 is arranged with spacing in the radial direction 24.

The thrust bearing 400 has a thrust bearing plate 420 which is rotationally fixedly coupled to the shaft 200. Also, the thrust bearing 400 has a thrust bearing chamber 430 in which the thrust bearing plate 420 is arranged. The thrust bearing plate 420 is arranged rotationally freely in the thrust bearing chamber 430. The thrust bearing chamber 430 is arranged on the compressor side of the bearing housing 300, and in particular is delimited by the compressor rear wall 140 and a wall portion 310 of the bearing housing 300. The wall portion 310 may have a radial portion and an axial portion which, together with the compressor rear wall 140, delimit the thrust bearing chamber 430. The thrust bearing chamber 430 is formed so as to be substantially annular. The thrust bearing 400 is accordingly arranged between the compressor rear wall 140 and the wall portion 310. The compressor rear wall 140 and/or the bearing housing 300 may form a part of the thrust bearing 400. In other embodiments, the thrust bearing 400 may be arranged between a compressor-side bearing housing cover and the bearing housing 300 (not shown in the Figures). Features which are described with respect to the arrangement of the thrust bearing 400 relative to the compressor rear wall 140 may also apply accordingly to the bearing housing cover.

As FIGS. 2 to 5 show, the bearing gap 410 extends between the thrust bearing plate 420 and the compressor rear wall 140. The bearing gap extends at least partially in the radial direction 24. In some embodiments, the bearing gap 410 may also extend continuously in the radial direction 24 between the thrust bearing plate 420 and the compressor rear wall 140. In other embodiments, the bearing gap 410 may also extend partially in an oblique direction, i.e. a combination of the radial direction 24 and axial direction 22. The bearing plate 420 has a first running surface 421, which runs substantially orthogonally to the axis 20 of the shaft 200 and faces the compressor wheel 120. In other words, the first running surface 421 lies at least partially opposite the compressor rear wall 140 and is arranged at least partially parallel thereto. The thrust bearing plate 420 has a second running surface 422, opposite the first running surface 421, which runs substantially parallel to the first running surface 421 and faces away from the compressor wheel 120. The bearing gap 410 extends between the first running surface 421 and the compressor rear wall 140. In particular, in this way, the leakage air stream in the bearing gap 410 may flow in the radial direction 24 between the first running surface 421 and the compressor rear wall 140, so that the leakage air stream creates an air film between these two components, which may lead to a reduction in thrust bearing loads.

As shown in FIG. 2 for example, the thrust bearing 400 comprises at least one first bearing film 450 and/or a second bearing film 460. The first bearing film 450 and the second bearing film 460 are arranged directly next to one another in the axial direction 22. The first bearing film 450 is arranged directly next to the compressor rear wall 140, and the second bearing film 460 is arranged in the axial direction 22 next to the thrust bearing plate 420, in particular next to the first running surface 421. In the embodiments of FIGS. 2 to 5, the first bearing film 450 is arranged directly on the compressor rear wall 140. The first bearing film 450 is designed to preload the second bearing film 460 in the axial direction 22 against the thrust bearing plate 420 or in the direction of the thrust bearing plate 420. In particular, the first bearing film 450 is arranged to be elastically compressible in the axial direction 22 between the second bearing film 460 and the compressor rear wall 140 by a movement of the second bearing film 460. During operation of the compressor 100, the bearing gap 410 is formed in the axial direction 22 between the thrust bearing plate 420, in particular the first running surface 421, and the second bearing film 460. The bearing gap 410 may create a bearing effect between the thrust bearing plate 420 and the compressor rear wall 140. In some embodiments, the first bearing film 450 may be a corrugated film. The second bearing film 460 may be a smooth film.

As described above, the thrust bearing 400 is an axial air bearing. The air film in the thrust bearing 400 may be generated by a rotation of the shaft 200 or of the thrust bearing plate 420, which is rotationally fixedly coupled to the shaft 200. Air particles are also set in motion by the rotational movement of the shaft 400 and/or the thrust bearing plate 420. A speed of the shaft 200 and/or the first running surface 421 relative to the air may amount to nil at a position on a surface of the shaft 200 and/or on the first running surface 421. In some embodiments, the second bearing film 460 may have a wedge-like structure. Because of the wedge structure and the air particles set in motion, a pressure may build up in the thrust bearing 400 between the bearing partners, in particular between the first running surface 421 and the second bearing film 460. Here an air film builds up in the bearing gap 410, which contributes to the axial mounting of the shaft 200. The fluid stream which is conducted into the thrust bearing 400, in particular into the bearing gap 410, may further reduce a necessary thrust bearing force for mounting the shaft 200.

As shown in FIGS. 2 to 5, the bearing gap 410 is a first bearing gap 410 of the thrust bearing 400. The thrust bearing 400 comprises a second bearing gap 900. This is arranged between the thrust bearing plate 420 and the bearing housing 300, in particular the wall portion 310 of the bearing housing 300. The thrust bearing 400 has a third bearing film 910 and a fourth bearing film 920. The third bearing film 910 here substantially has the above-described features of the first bearing film 450. The fourth bearing film 920 substantially has the above-described features of the second bearing film 460. The third bearing film 910 and the fourth bearing film 920 are arranged directly next to one another in the axial direction 22. The third bearing film 910 is arranged directly next to the bearing housing 300, in particular next to the radial portion of the wall portion 310. The fourth bearing film 920 is arranged in the axial direction 22 next to the thrust bearing plate 420, in particular next to the second running surface 422. In the embodiments of FIGS. 2 to 5, the third bearing film 910 is arranged directly on the wall portion 310 of the bearing housing 300. The third bearing film 910 is designed to preload the fourth bearing film 920 in the axial direction 22 against the thrust bearing plate 420 or in the direction of the thrust bearing plate 420. In particular, the third bearing film 910 is designed to be elastically compressible in the axial direction 22 between the fourth bearing film 920 and the wall portion 310 by a movement of the fourth bearing film 920. During operation of the compressor 100, the second bearing gap 900 is formed in the axial direction 22 between the thrust bearing plate 420, in particular the second running surface 422, and the fourth bearing film 920. The second bearing gap 900 may create a bearing effect between the thrust bearing plate 420 and the wall portion 310. In some embodiments, the third bearing film 910 may be a corrugated film. The fourth bearing film 920 may be a smooth film. During operation of the compressor 100, an air film, as described above for the first bearing gap 410, is also formed in the second bearing gap 900. The fluid stream, in particular the leakage air stream, is not however conducted through the second bearing gap 900, since it is discharged radially in the radial direction 24 after flowing through the first bearing gap 410.

Figure 3:
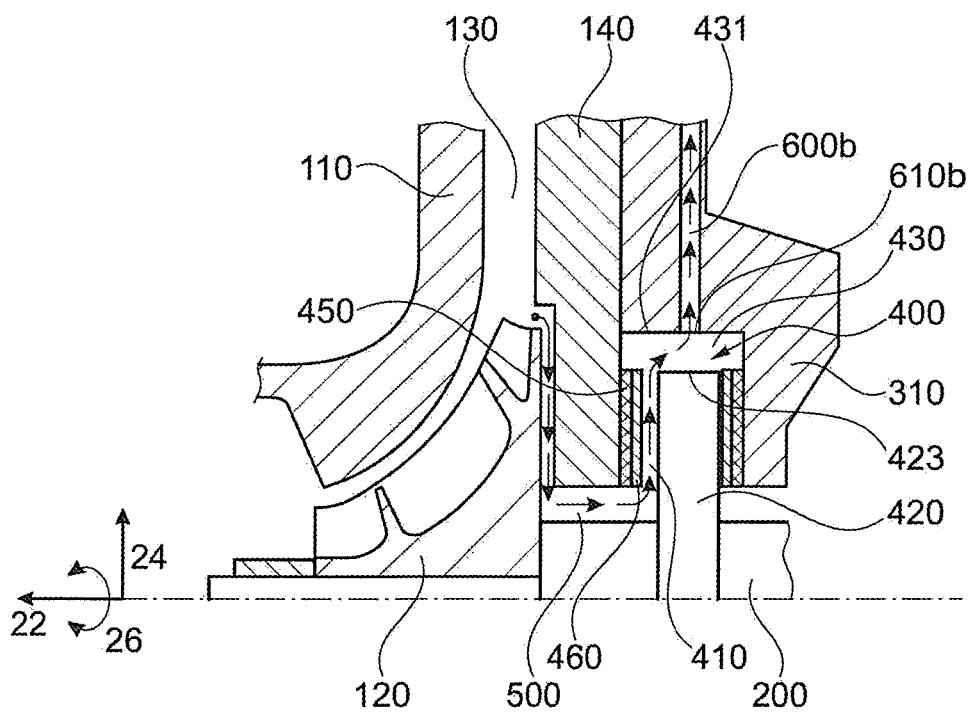
FIG. 3 shows a more detailed side sectional view of the thrust bearing according to a second embodiment.
Figure 5:
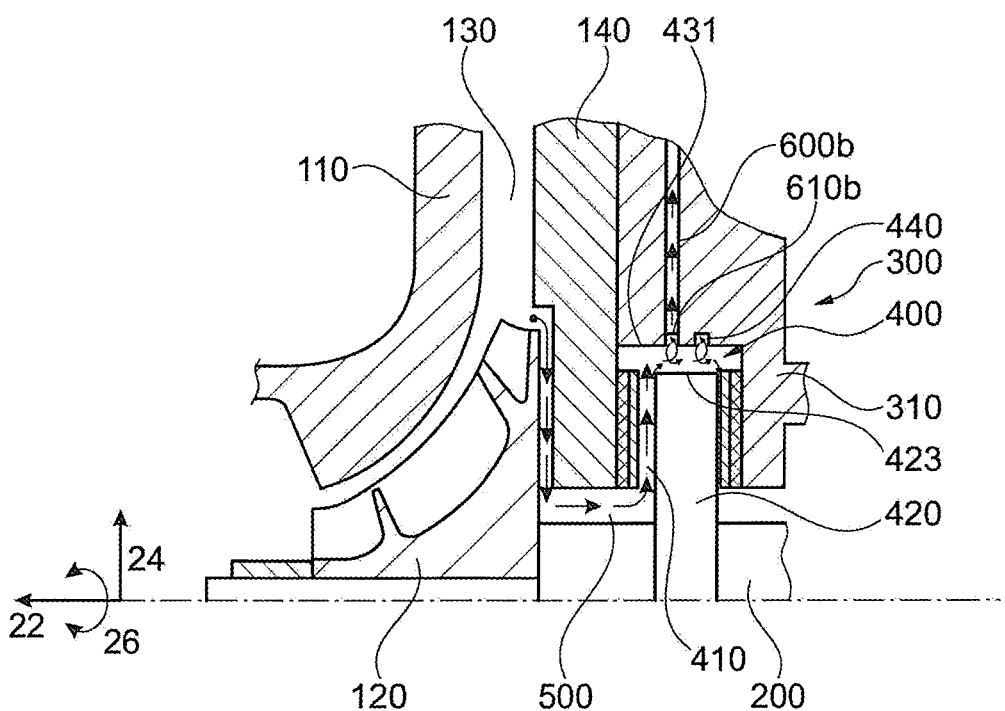
FIG. 5 shows a more detailed side sectional view of the thrust bearing according to a fourth embodiment.

As shown for example in FIGS. 2, 3 and 5, the thrust bearing plate 420 comprises a circumferential running surface 423 which extends in the axial direction 22 between the first running surface 421 and the second running surface 422. The thrust bearing plate 420 has a first radius r1, measured in the radial direction 24 between the shaft axis 20 and the circumferential running surface 423. The bearing gap 410 extends in the radial direction 24 in a region in which the compressor rear wall 140 lies opposite the first running surface 421. In particular, the bearing gap 410 extends in the radial direction 24 up to the circumferential running surface 423. The bearing gap 410 may extend in the radial direction 24 between the passage 141 in the compressor rear wall 140 and the circumferential running surface 423. In other words, the bearing gap 410 may extend in the radial direction 24 at the site where the compressor rear wall 140, in particular the second bearing film 460, and the first running surface 421 lie opposite one another. The compressor rear wall 140 may here run completely or partially parallel to the first running surface 421.

As shown for example in FIG. 2, the thrust bearing chamber 430 has an inner circumferential face 431 with a second radius r2, measured in the radial direction 24 between the shaft axis 20 and the inner circumferential face 431. As described above, the shaft axis 20 here runs coaxially to the axial direction 22. The first radius r1 is smaller than the second radius r2. The first radius r1 is smaller than a third radius r3 of the compressor wheel 120, measured in the radial direction 24 between a shaft axis 20 and an outer circumference of the compressor wheel 120.

According to FIGS. 2 to 5, the charging device 10 comprises at least one supply channel 500 which fluidically connects the thrust bearing 400, in particular the bearing gap 410, to the pressure side 130 of the compressor 100. Furthermore, the charging device 10 comprises at least one return channel 600a, 600b, 600c which is designed to discharge the fluid stream, flowing in the radial direction 24 through the bearing gap 410 during operation of the compressor 100, out of the thrust bearing 400, in particular out of the bearing gap 410. As FIG. 2 shows, a first pressure p1 in the supply channel 500 is greater than a second pressure p2 in the return channel 600a, 600b, 600c. In other words, the first pressure p1, measured for example at an inlet 530 of the supply channel 500, may be greater than the second pressure p2, measured for example at an outlet 620 of the return channel 600a, 600b, 600c. This may ensure that the fluid stream is conducted through the bearing gap 410 because of a pressure difference $\Delta p$.

The supply channel 500 has a supply channel inlet 530 which is arranged at a position w1 between the compressor wheel 120 and the compressor rear wall 140. The supply channel 500 has a supply channel outlet 540 which opens into the bearing gap 410. The supply channel 500 is configured such that the fluid stream is conducted from the pressure side 130 of the compressor 100, in particular from the supply channel inlet 530, substantially in the radial direction 24 towards the shaft 200 and/or in the axial direction 22 to the bearing gap 410, in particular to the supply channel outlet 540. The supply channel 500 has an axial supply channel portion 510 which extends, starting from the bearing gap 410, substantially in the axial direction 22, in particular towards the compressor wheel 120, through the compressor rear wall 140 and/or between the shaft 200 and the compressor rear wall 140. The axial supply channel portion 510 may be designed so as to be annular and extend in the radial direction 24 between the shaft 200 and the passage 141. The axial supply channel portion 510 may extend in the axial direction 22, starting from the bearing gap 410, through the compressor rear wall 140 to a side face of the compressor rear wall 140 next to the compressor wheel 120. The supply channel 500 has a radial supply channel portion 520 which extends, starting from an axial supply channel portion 510, substantially in the radial direction 24, in the compressor rear wall 140 and/or next to the compressor rear wall 140 to the supply channel inlet 530. In particular, the radial supply channel portion 520 may extend towards the back of the compressor wheel, or to the pressure side 130 of the compressor 100. In some embodiments, the radial supply channel portion 520 may extend, starting from the axial supply channel portion 510, at least partially in the radial direction 24, in the compressor rear wall 140 and/or on the side face of the compressor rear wall 140 next to the compressor wheel 120. In some embodiments, the radial supply channel portion 520 may be arranged as a disc in the compressor rear wall 140 and extend up to a radius which is greater than the third radius r3 of the compressor wheel 120. The compressor wheel 120 may also be arranged in the axial direction 22 partially in the disc-like depression of the radial supply channel portion 520 (see for example the offset between the back of the compressor wheel and the side face of the compressor rear wall 140 in FIG. 2). In other embodiments, the radial supply channel portion 520 may be provided as at least one continuous bore in the compressor rear wall 140, which connects together the supply channel inlet 530 and the axial supply channel portion 510. As illustrated in FIG. 2 for example with arrows, the fluid stream flows from position w1 initially substantially in the radial direction 24 towards the shaft, then in the axial direction 22 between the passage 141 and the shaft 200 towards the bearing housing, and in front of the thrust bearing plate 420 in the radial direction 24 into the bearing gap 410. In the example shown in FIG. 2, the fluid stream then flows in the radial direction 24 through the bearing gap 410 to a position in the thrust bearing chamber 430 radially outside the thrust bearing plate 420.

According to a first embodiment as shown in FIG. 1, the return channel 600a, 600b, 600c fluidically connects the thrust bearing 400, in particular the bearing gap 410, to the compressor inlet 150. The return channel 600 is here configured such that the fluid stream, flowing in the radial direction 24 through the bearing gap 410 during operation of the compressor 100, is conducted to the compressor inlet 150. The return channel 600a, 600b, 600c has a return channel outlet 620 which is connected to the compressor inlet 150. The present leakage air stream can flow back into the compressor inlet 150 through the return channel outlet 620. As FIG. 1 shows, the return channel outlet 620 opens into the compressor inlet 150, in particular into the return chamber 153, orthogonally to the axial direction 22. The compressor inlet 150 here extends substantially in the axial direction 22. In other embodiments (not shown in the Figures), the return channel outlet 620 may open into the compressor inlet 150 at an angle β<90° measured between a channel axis 28 of the return channel 600, in particular in a region of the return channel outlet, and the axial direction 22.

According to another embodiment (not shown in the Figures), the charging device 10 may comprise a fuel cell. The return channel 600a, 600b, 600c may fluidically connect the thrust bearing 400, in particular the bearing gap 410, to the fuel cell. The return channel 600a, 600b, 600c may be configured such that the fluid stream, flowing in the radial direction 24 through the bearing gap 410 during operation of the compressor 100, is conducted to the fuel cell. The fuel cell may contain an electrolyte with an ion-permeable, gas-impermeable membrane, and two electrodes, in particular an anode and a cathode. The electrodes are here coated with a catalytic coating. The membrane may be encased by two bipolar plates, wherein the bipolar plates contain reaction fluid channels. In particular, the return channel 600a, 600b, 600c may fluidically connect the bearing gap 410 to reaction fluid channels in one of the bipolar plates on a cathode side of the membrane. In this embodiment, the return channel 600a, 600b, 600c may comprise a return channel outlet which opens into at least one of the reaction fluid channels.

According to a further embodiment (not shown in the Figures), the charging device 10 may comprise a turbine. The return channel 600a, 600b, 600c may here fluidically connect the thrust bearing 400, in particular the bearing gap 410, to the turbine casing outlet. The return channel 600a, 600b, 600c may be configured such that the fluid stream, flowing in the radial direction 24 through the bearing gap 410 during operation of the compressor 100, is conducted to the turbine casing outlet. In this embodiment, the return channel 600a, 600b, 600c may comprise a return channel outlet which opens into the turbine casing outlet, i.e. downstream of the turbine wheel.

As shown in FIGS. 1 to 5, the return channel 600a, 600b, 600c comprises a return channel inlet 610a, 610b, 610c which is fluidically connected to the bearing gap 410 and/or to the thrust bearing chamber 430. A leakage air stream from the bearing gap 410 can enter the return channel 600a, 600b, 600c through the return channel inlet 610a, 610b, 610c. In some embodiments, the return channel 600a, 600b, 600c may be arranged at least in portions in the bearing housing 300 and/or in the compressor housing 110. Also, the return channel 600a, 600b, 600c may be arranged at least in portions in an external line element 630. Alternatively or additionally, in the embodiment in which the charging device 10 comprises a turbine, the return channel 600a, 600b, 600c may be arranged at least in portions in the turbine casing. Alternatively or additionally, in the embodiment in which the charging device 10 comprises a fuel cell, the return channel 600a, 600b, 600c may be arranged at least in portions in a housing part of the fuel cell.

The return channel 600a, 600b, 600c may have a valve element which can be moved between a closed position, in which the return channel is closed, into an open position in which the return channel is at least partially open (not shown in Figures). One return channel 600a, 600b, 600c may be sufficient since the bearing gap 410 is surrounded radially outwardly by an annular collecting portion of the thrust bearing chamber 430, which extends in the radial direction 24 between the radii r1 and r2 and/or in the axial direction 22 between the compressor rear wall 140 and the wall portion 310 of the bearing housing 300. More than one return channel 600a, 600b, 600c may also be provided. In some embodiments, the charging device may comprise two return channels 600a, 600b, 600c which are spaced apart from one another in the circumferential direction 26, in particular at an angle of 180°. There may also be more than two return channels 600a, 600b, 600c, which are evenly spaced apart from one another in the circumferential direction 26.

As shown in FIGS. 1 to 5, the return channel inlet 610a, 610b, 610c is arranged in the radial direction 24 radially outside the thrust bearing plate 420. In particular, the return channel inlet 610a, 610b, 610c is arranged on the inner circumferential face 431 of the thrust bearing chamber 430. Alternatively, the return channel inlet 610a, 610b, 610c may also be arranged in the compressor rear wall 140. In some embodiments, the return channel inlet 610a, 610b, 610c may also be arranged in the compressor rear wall 140, in the radial direction 24 at a position between the thrust bearing plate 420 and the inner circumferential face 431. Alternatively, the return channel inlet 610a, 610b, 610c may be arranged in the wall portion 310 of the bearing housing 300 at a position between the thrust bearing plate 420 and the inner circumferential face 431.

The return channel 600a, 600b, 600c may comprise a first return channel 600a with a first return channel inlet 610a, a second return channel 600b with a second return channel inlet 610b, and/or a third return channel 600c with a third return channel inlet 610c. According to a first embodiment, as shown in FIG. 2, the first return channel inlet 610a may be arranged on the inner circumferential face 431, in the axial direction 22 next to the compressor rear wall 140. In particular, the first return channel inlet 610a may be arranged on the inner circumferential face 431, in the axial direction 22 at least partially between the compressor rear wall 140 and the thrust bearing plate 420. The fluid stream may here flow substantially directly in the radial direction 24 out of the bearing gap 410 into the first return channel inlet 610a.

According to a second embodiment, as shown in FIG. 3, the second return channel inlet 610b may be arranged on the inner circumferential face 431, in the axial direction 22 substantially centrally between the compressor rear wall 140 and the wall portion 310. In other words, the second return channel inlet 610b may be arranged on the inner circumferential face 431, in the axial direction 22 substantially opposite the circumferential running surface 423. As shown in FIG. 3, the fluid stream flows initially through the bearing gap 410 in the radial direction 24; then, at a position radially outside the bearing gap 410 and/or the thrust bearing plate 420, at least partially in the axial direction 22, in particular towards the bearing housing 300 and/or the electric motor 710; and at the axial position of the second return channel inlet 610b, again in the radial direction 24 into the second return channel inlet 610b.

Figure 4:
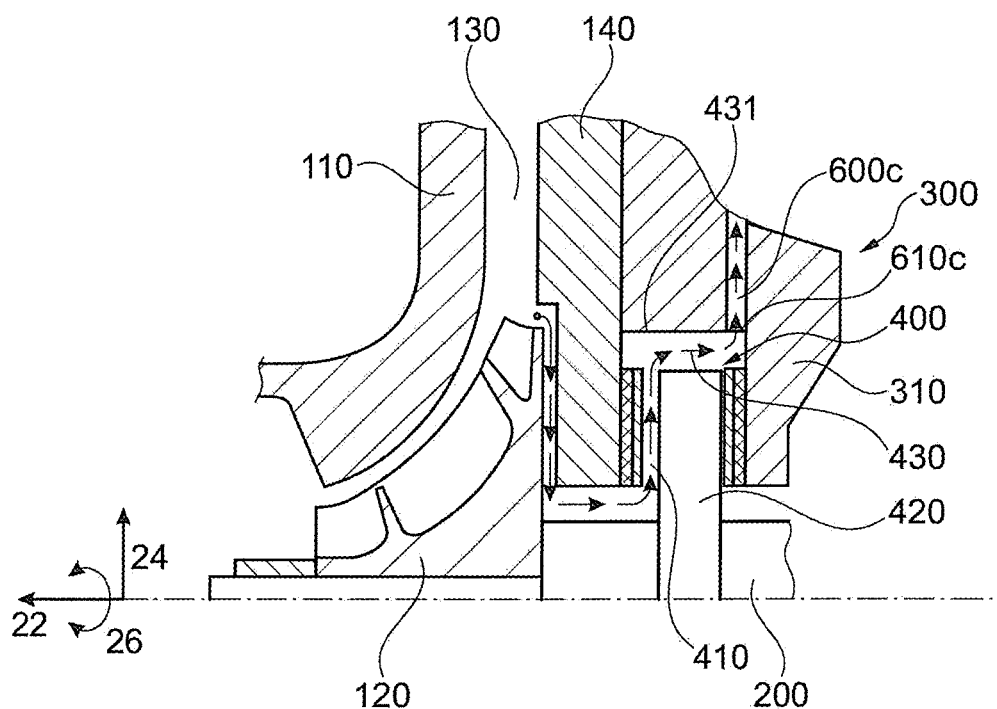
FIG. 4 shows a more detailed side sectional view of the thrust bearing according to a third embodiment.

According to a third embodiment shown in FIG. 4, the third return channel inlet 610c may be arranged on the inner circumferential face 431, in the axial direction 22 next to the wall portion 310 of the bearing housing 300 which lies opposite the second running surface 422. In particular, the third return channel inlet 610c may be arranged on the inner circumferential face 431, in the axial direction 22 at least partially between the wall portion 310 and the thrust bearing plate 420. As shown in FIG. 4, the fluid stream initially flows through the bearing gap 410 in the radial direction 24; then, at a position radially outside the bearing gap 410 and/or the thrust bearing plate 420, at least partially in the axial direction 22, in particular towards the bearing housing 300 and/or electric motor 710; and at the axial position of the third return channel inlet 610c, again in the radial direction 24 into the third return channel inlet 610c.

According to a fourth embodiment, as shown for example in FIG. 5, which may be combined with all above-described arrangements of the return channel inlets 610a, 610b, 610c, a sealing element 440 may be arranged between the thrust bearing plate 420 and the inner circumferential face 431. In one embodiment, the sealing element 440 may be a labyrinth seal. In particular, the sealing element 440 may be arranged between the circumferential running surface 423 and the inner circumferential face 431. The sealing element 440 may achieve an improved pressure distribution at the thrust bearing plate 420, wherein also an axial force component, in the axial direction 22 towards the compressor wheel 120, in the thrust bearing 400 may be further reduced. In preferred embodiments, the sealing element 440 may comprise at least one (in particular circumferential) groove which is arranged on the inner circumferential face 431 and lies opposite the circumferential running surface 423 in the radial direction 24. In the embodiments shown in FIGS. 2 and 5, two grooves may be arranged on the inner circumferential face 431, which are spaced apart from one another in the axial direction 22 and lie opposite the circumferential running surface 423 in the radial direction 24. In further embodiments, the sealing element 440 may also comprise more than two grooves. The at least one groove may cause an eddying (see small arrows in FIGS. 2 and 5) of the fluid stream between the inner circumferential face 431 and the thrust bearing plate 420, in particular between the inner circumferential face 431 and the circumferential running surface 423, which may lead to a further fall in pressure and improve a sealing effect between the inner circumferential face 431 and the thrust bearing plate 420.

In the first embodiment of FIG. 2, the first return channel inlet 610a may be arranged in the axial direction 22 between the compressor rear wall 140 and the sealing element 440. In combination with the embodiment in FIG. 4, the third return channel inlet 610c may be arranged in the axial direction 22 between the wall portion 310 and the sealing element 440.

In the fourth embodiment according to FIG. 5, the second return channel inlet 610b may be arranged in the sealing element 440. The second return channel inlet 610b may here be arranged such that the fluid stream can enter the second return channel inlet 610b in the axial direction 22 at a position between the compressor rear wall 140 and the sealing element 440. In particular, the second return channel inlet 610b may be arranged on a floor of the at least one groove. In the embodiment shown in FIG. 5, in which two grooves are provided, the second return channel inlet 610b may be arranged on the floor of the groove which is lies first in the axial direction 22, starting from the compressor wheel 120 towards the bearing housing 300. As shown in FIG. 5, the fluid stream initially flows through the bearing gap 410 in the radial direction 24; then, at a position radially outside the bearing gap 410 and/or the thrust bearing plate 420, at least partially in the axial direction 22 through the sealing element 440, and/or between the sealing element 440 and the thrust bearing plate 420, in particular towards the bearing housing 300 and/or the electric motor 710; and at the axial position of the second return channel inlet 610b, again in the radial direction 24 into the second return channel inlet 610b.

Although the present invention has been described above and is defined in the appended claims, it should be understood that alternatively the invention may also be defined according to the following embodiments:

1. A charging device (10) for an internal combustion engine or a fuel cell, comprising:
   a compressor (100) with a compressor housing (110) and compressor wheel (120) arranged therein,
   a shaft (200) which is coupled to the compressor wheel (120), and
   a bearing housing (300) which is connected to the compressor housing and in which the shaft (200) is rotatably mounted, wherein the bearing housing (300) comprises a thrust bearing (400) for axial mounting of the shaft (200),
   wherein the thrust bearing has a bearing gap (400) which extends at least partially in a radial direction (24) relative to the shaft (200), characterized in that the thrust bearing (400) is fluidically connected to the compressor (100) and arranged such that when the compressor (100) is in operation, a fluid stream from the compressor (100) flows at least partially in the radial direction (24) through the bearing gap (410).
2. The charging device (10) according to embodiment 1, characterized in that the thrust bearing (400) is an axial air bearing.
3. The charging device (10) according to embodiment 1 or embodiment 2, characterized in that the thrust bearing (400), in particular the bearing gap (410) of the thrust bearing (400), is fluidically connected to the pressure side (130) of the compressor (100).
4. The charging device (10) according to any of the preceding embodiments, characterized in that the fluid stream is a leakage air stream.
5. The charging device (10) according to any of the preceding embodiments, characterized in that the thrust bearing (400) is formed in the axial direction (22) between the compressor wheel (120) and the bearing housing (300).
6. The charging device (10) according to any of the preceding embodiments, characterized in that the compressor housing (110) comprises a compressor rear wall (140).
7. The charging device (10) according to embodiment 6, characterized in that the thrust bearing (400) is arranged in the axial direction (22) between the compressor rear wall (140) and the bearing housing (300).
8. The charging device (10) according to embodiment 6 or embodiment 7, characterized in that the thrust bearing (400) is arranged in the axial direction between the compressor wheel wall (120) and the thrust bearing (400).
9. The charging device (10) according to any of the preceding embodiments, characterized in that the thrust bearing (400) comprises a thrust bearing plate (420) which is rotationally fixedly coupled to the shaft (200).
10. The charging device (10) according to embodiment 9, characterized in that the thrust bearing (400) has a thrust bearing chamber (430) in which the thrust bearing plate (420) is arranged.
11. The charging device (10) according to embodiment 10, where dependent on embodiment 6, characterized in that the bearing gap (410) extends between the thrust bearing plate (420) and the compressor rear wall (140).
12. The charging device (10) according to any of embodiments 9 to 11, characterized in that the thrust bearing plate (420) has a first running surface (421), which extends substantially orthogonally to the axis (20) of the shaft (200) and faces the compressor wheel (120), and that the thrust bearing plate (420) has a second running surface (422), opposite the first running surface (421), which runs substantially parallel to the first running surface (421) and faces away from the compressor wheel (120).
13. The charging device (10) according to embodiment 12, characterized in that the bearing gap (410) extends between the first running surface (421) and the compressor rear wall (140).
14. The charging device (10) according to any of the preceding embodiments, characterized in that the thrust bearing (400) has at least one first bearing film (450) and/or a second bearing film (460).
15. The charging device (10) according to embodiment 14, characterized in that the first bearing film (450) and the second bearing film (460) are arranged lying directly next to one another in the axial direction (22).
16. The charging device (10) according embodiment 14 or embodiment 15, where dependent on embodiment 12, characterized in that the first bearing film (450) is arranged directly next to the compressor rear wall (140), and the second bearing film (460) is arranged in the axial direction (22) next to the thrust bearing plate (420), in particular next to the first running surface (421).
17. The charging device (10) according to any of embodiments 14 to 16, characterized in that the first bearing film (450) is designed to preload the second bearing film (460) in the axial direction (22) against the thrust bearing plate (420).
18. The charging device (10) according to any of embodiments 14 to 17, characterized in that the first bearing film (450) is designed to be elastically compressible in the axial direction (22) between the second bearing film (460) and the compressor rear wall (140) by a movement of the second bearing film (460).
19. The charging device (10) according to any of embodiments 14 to 18, where dependent on embodiment 12, wherein during operation, the bearing gap (410) is formed in the axial direction (22) between the thrust bearing plate (420), in particular the first running surface (421), and the second bearing film (460).
20. The charging device (10) according to any of embodiments 12 to 19, characterized in that the thrust bearing plate (420) comprises a circumferential running surface (423) which extends between the first running surface (421) and the second running surface (422), in particular wherein the thrust bearing plate (420) has a first radius (r1), measured in the radial direction (24) between the shaft axis (20) and the circumferential running surface (423).
21. The charging device (10) according to embodiment 20, characterized in that the bearing gap (24) extends in the radial direction (24) in a region in which the compressor rear wall (14) lies opposite the first running surface (421), in particular wherein the bearing gap (410) extends in the radial direction (24) up to the circumferential running surface (423).
22. The charging device (10) according to any of embodiments 10 to 21, characterized in that the thrust bearing chamber (430) has an inner circumferential face (431) with a second radius (r2), measured in the radial direction (24) between the shaft axis (22) and the inner circumferential face (431).
23. The charging device (10) according to embodiment 22, where dependent on embodiment 20, characterized in that the first radius (r1) is smaller than the second radius (r2).
24. The charging device (10) according to any of embodiments 20 to 23, characterized in that the first radius (r1) is smaller than a third radius (r3) of the compressor wheel (120), measured in the radial direction (24) between a shaft axis (20) and an outer circumference of the compressor wheel (120).
25. The charging device (10) according to any of embodiments 6 to 24, characterized in that the compressor rear wall (140) has a cylindrical passage (141) in which the shaft (200) is arranged with a spacing in the radial direction (24).
26. The charging device (10) according to any of the preceding embodiments, furthermore comprising at least one supply channel (500) which fluidically connects the thrust bearing (400) to the pressure side (130) of the compressor (100).

27. The charging device (10) according to any of the preceding embodiments, furthermore comprising at least one return channel (600a, 600b, 600c) which is designed to discharge the fluid stream, flowing through the bearing gap (410) in the radial direction (24) during operation of the compressor, out of the thrust bearing (400), in particular out of the bearing gap (410).

28. The charging device (10) according to embodiments 26 and 27, characterized in that a first pressure (p1) in the supply channel (500) is greater than a second pressure (p2) in the return channel (600a, 600b, 600c).

29. The charging device (10) according to any of embodiments 26 to 28, characterized in that the supply channel (500) has a supply channel inlet (530) which is arranged at a position (w1) between the compressor wheel (120) and the compressor rear wall (140), and the supply channel (500) has a supply channel outlet (540) which opens into the bearing gap (410).

30. The charging device (10) according to embodiment 29, characterized in that the supply channel (500) is configured such that the fluid stream is conducted from the pressure side (130) of the compressor, in particular from the supply channel inlet (530), substantially in the radial direction (24) towards the shaft (200) and/or in the axial direction (22) to the bearing gap (410), in particular to the supply channel outlet (540).

31. The charging device (10) according to any of embodiments 26 to 30, characterized in that the supply channel (500) has an axial supply channel portion (510) which extends, starting from the bearing gap (410), substantially in the axial direction (22), in particular towards the compressor wheel (120), through the compressor rear wall (140) and/or between the shaft (200) and the compressor rear wall (140).

32. The charging device (10) according to embodiment 31, characterized in that the supply channel (500) has a radial supply channel portion (520) which extends, starting from the axial supply channel portion (510), substantially in the radial direction (24) in the compressor rear wall (140) to the supply channel inlet (530).

33. The charging device (10) according to any of preceding embodiments, characterized in that the compressor housing (110) comprises a compressor inlet (150).

34. The charging device (10) according to embodiment 33, where dependent on any of embodiments 27 to 33, wherein the return channel (600a, 600b, 600c) fluidically connects the thrust bearing (400), in particular the bearing gap (410), to the compressor inlet (150).

35. The charging device (10) according to embodiment 34, characterized in that the return channel (600a, 600b, 600c) is designed such that the fluid stream, flowing through the bearing gap (410) in the radial direction (24) during operation of the compressor (100), is conducted to the compressor inlet (150).

36. The charging device (10) according to any of embodiments 27 to 33, furthermore comprising a fuel cell, characterized in that the return channel (600a, 600b, 600c) fluidically connects the thrust bearing (400), in particular the bearing gap (410), to the fuel cell.

37. The charging device (10) according to embodiment 36, characterized in that the return channel (600a, 600b, 600c) is designed such that the fluid stream, flowing through the bearing gap (410) in the radial direction (24) during operation of the compressor, is conducted to the fuel cell.

38. The charging device (10) according to any of embodiments 27 to 33, furthermore comprising a turbine which has a turbine casing with a turbine wheel arranged therein, and a turbine casing outlet, characterized in that the return channel (600a, 600b, 600c) fluidically connects the thrust bearing (400), in particular the bearing gap (410), to the turbine casing outlet.

39. The charging device (10) according to embodiment 38, characterized in that the return channel (600a, 600b, 600c) is designed such that the fluid stream, flowing through the bearing gap (410) in the radial direction (24) during operation of the compressor, is conducted to the turbine casing outlet.

40. The charging device (10) according to any of embodiments 27 to 39, where dependent on embodiment 10, characterized in that the return channel (600a, 600b, 600c) has a return channel inlet (610a, 610b, 610c) which is fluidically connected to the bearing gap (410) and/or to the thrust bearing chamber (430).

41. The charging device (10) according to any of embodiments 33 to 35 or 40, where dependent on embodiment 23, characterized in that the return channel (600) has a return channel outlet (620) which is connected to the compressor inlet (150).

42. The charging device (10) according to any of embodiments 27 to 41, characterized in that the return channel (600a, 600b, 600c) is arranged at least in portions in the bearing housing (300) and/or in the compressor housing (110).

43. The charging device (10) according to any of embodiments 27 to 42, characterized in that the return channel (600a, 600b, 600c) is arranged at least in portions in an external line element (630).

44. The charging device (10) according to any of embodiments 27 to 43, characterized in that the return channel (600a, 600b, 600c) comprises a valve element which can be moved between a closed position, in which the return channel is closed, and an open position in which the return channel is at least partially open.

45. The charging device (10) according to any of embodiments 40 to 44, where dependent on embodiment 9 and 22, characterized in that the return channel inlet (610a, 610b, 610c) is arranged radially outside the thrust bearing plate (420) in the radial direction (24), in particular wherein the return channel inlet (610a, 610b, 610c) is arranged on the inner circumferential face (431) of the thrust bearing chamber (430).

46. The charging device (10) according to any of embodiments 22 to 45, where dependent on embodiment 8, characterized in that a sealing element (440) is arranged between the thrust bearing plate (420) and the inner circumferential face (431), in particular wherein the sealing element (440) is a labyrinth seal.

47. The charging device (10) according to any of embodiments 40 to 46, where dependent on embodiment 6, 9 and 22, characterized in that the return channel inlet (610a) is arranged on the inner circumferential face (431), in the axial direction (22) next to the compressor rear wall (140), in particular wherein the return channel inlet (610) is arranged on the inner circumferential face (431), in the axial direction (22) at least partially between the compressor rear wall (140) and the thrust bearing plate (420).

48. The charging device (10) according to any of embodiments 40 to 46, where dependent on embodiment 9, 12 and 22, characterized in that the return channel inlet (610*c*) is arranged on the inner circumferential face (431), in the axial direction (22) next to a wall portion (310) of the bearing housing (300) which lies opposite the second running surface (422), in particular wherein the return channel inlet (610) is arranged on the inner circumferential face (431), in the axial direction (22) at least partially between the wall portion (310) and the thrust bearing plate (420).

49. The charging device (10) according to any of embodiments 40 to 46, where dependent on embodiment 22, characterized in that the return channel inlet (610*b*) is arranged on the inner circumferential face (431), in the axial direction (22) substantially centrally between the compressor rear wall (140) and the wall portion (310).

50. The charging device (10) according to any of embodiments 40 to 46 or 49, where dependent on embodiment 20 and 22, characterized in that the return channel inlet (610*b*) is arranged on the inner circumferential face (431), in the axial direction (22) substantially opposite the circumferential running surface (423).

51. The charging device (10) according to any of embodiments 46 to 50, where dependent on embodiment 6 and 40, characterized in that the return channel inlet (610*b*) is arranged in the sealing element (440), or that the return channel inlet (610*b*) is arranged in the axial direction (22) between the compressor rear wall (140) and the sealing element (440).

52. The charging device (10) according to any of embodiments 41 to 51, where dependent on embodiment 33, characterized in that the return channel outlet (620) opens into the compressor inlet (150) orthogonally to the axial direction (22).

53. The charging device (10) according to any of embodiments 41 to 51, characterized in that the return channel outlet (620) opens into the compressor inlet (150) at an angle β<90° between a channel axis (28) of the return channel (600) and the axial direction (22).

54. The charging device (10) according to any of the preceding embodiments, characterized in that the compressor housing (110) has a compressor outlet (160) with a compressor volute.

55. The charging device (10) according to any of embodiments 33 to 54, characterized in that the compressor inlet (150) has an inlet portion (151) and a casing portion (152), wherein a return chamber (153) extends between the casing portion (152) and the compressor housing (110) and/or the inlet portion (151).

56. The charging device (10) according to embodiment 55, characterized in that the return chamber (153) extends from a chamber inlet (153*a*), which is arranged axially between the casing portion (152) and the compressor housing (110), to a chamber outlet (153*b*) which is arranged axially between the casing portion (152) and the inlet portion (151).

57. The charging device (10) according to embodiment 55 or embodiment 56, where dependent on embodiment 41, characterized in that the return channel outlet (620) opens into the return chamber (153).

58. The charging device (10) according to any of the preceding embodiments, furthermore comprising a drive unit (700), wherein the compressor wheel (120) is connected to the drive unit (700) via the shaft (200).

59. The charging device (10) according to embodiment 58, characterized in that the drive unit (700) comprises a turbine and/or an electric motor (710).

60. The charging device (10) according to embodiment 59, characterized in that the electric motor (710) is arranged in a motor chamber in the bearing housing (300).

61. The charging device (10) according to embodiment 59 or embodiment 60, characterized in that the electric motor (710) has a rotor (711) and a stator (712), in particular wherein the rotor (711) is arranged on the shaft (200), and wherein the stator (712) surrounds the rotor (711).

62. The charging device (10) according to any of embodiments 59 to 61, furthermore comprising a power electronics circuit for controlling the electric motor (710), which is arranged in a receiving chamber in the bearing housing (300).

63. The charging device (10) according to any of the preceding embodiments, characterized in that the bearing housing (300) comprises a radial bearing arrangement (800*a*, 800*b*) for radial mounting of the shaft (200).

The invention claimed is:

1. A charging device (10) for an internal combustion engine or a fuel cell, comprising:
    a compressor (100) with a compressor housing (110) and a compressor wheel (120) arranged in the compressor housing (110),
    a shaft (200) which is coupled to the compressor wheel (120),
    a bearing housing (300) which is connected to the compressor housing and in which the shaft (200) is rotatably mounted, wherein the bearing housing (300) comprises a thrust bearing (400) for axial mounting of the shaft (200), wherein the thrust bearing has a bearing gap (410) which extends at least partially in a radial direction (24) relative to the shaft (200), and
    at least one return channel (600*a*, 600*b*, 600*c*),
    wherein the thrust bearing (400) is fluidically connected to a pressure side (130) of the compressor (100) and arranged such that when the compressor (100) is in operation, a fluid stream from the compressor (100) flows at least partially in the radial direction (24) through the bearing gap (410),
    wherein the at least one return channel (600*a*, 600*b*, 600*c*) is designed to discharge the fluid stream, flowing in the radial direction (24) radially outwardly through the bearing gap (410) during operation of the compressor, out of the thrust bearing (400),
    wherein the thrust bearing (400) comprises a thrust bearing plate (420) which is rotationally fixedly coupled to the shaft (200),
    wherein the thrust bearing (400) comprises a thrust bearing chamber (430) in which the thrust bearing plate (420) is arranged and which has an inner circumferential face (431), and
    wherein a sealing element (440) comprising a circumferential groove is provided between the inner circumferential face (431) and a circumferential running surface (423) of the thrust bearing plate (420).

2. The charging device (10) as claimed in claim 1, wherein the thrust bearing (400) is an axial air bearing, and wherein the bearing gap (410) of the thrust bearing (400) is fluidically connected to the pressure side (130) of the compressor (100).

3. The charging device (10) as claimed in claim 1, wherein the compressor housing (110) comprises a compressor inlet (150), and the return channel (600a, 600b, 600c) fluidically connects the bearing gap (410) to the compressor inlet (150).

4. The charging device (10) as claimed in claim 1, further comprising a fuel cell, wherein the return channel (600a, 600b, 600c) fluidically connects the bearing gap (410) to the fuel cell.

5. The charging device (10) as claimed in claim 1, further comprising a turbine which has a turbine casing with a turbine wheel arranged therein, and a turbine casing outlet, wherein the return channel (600a, 600b, 600c) fluidically connects the bearing gap (410) to the turbine casing outlet.

6. The charging device (10) as claimed in claim 1, further comprising a drive unit (700), wherein the compressor wheel (120) is coupled to the drive unit (700) via the shaft (200).

7. The charging device (10) as claimed in claim 1, wherein the return channel (600a, 600b, 600c) has a return channel inlet (610a, 610b, 610c) which is fluidically connected to the bearing gap (410), and wherein the return channel inlet (610a, 610b, 610c) is arranged radially outside the thrust bearing plate (420) in the radial direction (24).

8. The charging device (10) as claimed in claim 7, wherein the return channel inlet (610a, 610b, 610c) is arranged on the inner circumferential face (431) of the thrust bearing chamber (430).

9. The charging device (10) as claimed in claim 7, wherein the return channel inlet (610b) is arranged in the sealing element (440), or wherein the return channel inlet (610a) is arranged in an axial direction (22) between a compressor rear wall (140) and the sealing element (440).

10. The charging device (10) as claimed in claim 1, wherein the compressor housing (110) comprises a compressor rear wall (140) and wherein the thrust bearing (400) is arranged in an axial direction (22) between the compressor rear wall (140) and the bearing housing (300).

11. The charging device (10) as claimed in claim 10, wherein the bearing gap (410) extends between the thrust bearing plate (420) and the compressor rear wall (140).

12. The charging device (10) as claimed in claim 10, further comprising at least one supply channel (500) which fluidically connects the thrust bearing (400) to the pressure side (130) of the compressor (100).

13. The charging device (10) as claimed in claim 12, wherein the supply channel (500) has a supply channel inlet (530) which is arranged at a position (w1) between the compressor wheel (120) and the compressor rear wall (140), and the supply channel (500) has a supply channel outlet (540) which opens into the bearing gap (410).

14. The charging device (10) as claimed in claim 13, wherein the supply channel (500) is configured such that the fluid stream is conducted from the supply channel inlet (530) in the radial direction (24) to the shaft (200) and/or in the axial direction (22) to the supply channel outlet (540).

15. A charging device (10) for an internal combustion engine or a fuel cell, comprising:
  a compressor (100) with a compressor housing (110) and a compressor wheel (120) arranged in the compressor housing (110),
  a shaft (200) which is coupled to the compressor wheel (120),
  a bearing housing (300) which is connected to the compressor housing and in which the shaft (200) is rotatably mounted, wherein the bearing housing (300) comprises a thrust bearing (400) for axial mounting of the shaft (200), wherein the thrust bearing has a bearing gap (410) which extends at least partially in a radial direction (24) relative to the shaft (200), and
  at least one return channel (600a, 600b, 600c),
  wherein the thrust bearing (400) is fluidically connected to a pressure side (130) of the compressor (100) and arranged such that when the compressor (100) is in operation, a fluid stream from the compressor (100) flows at least partially in the radial direction (24) through the bearing gap (410),
  wherein the at least one return channel (600a, 600b, 600c) is designed to discharge the fluid stream, flowing in the radial direction (24) radially outwardly through the bearing gap (410) during operation of the compressor, out of the thrust bearing (400),
  wherein the thrust bearing (400) comprises a thrust bearing plate (420) which is rotationally fixedly coupled to the shaft (200),
  wherein the thrust bearing (400) comprises a thrust bearing chamber (430) in which the thrust bearing plate (420) is arranged and which has an inner circumferential face (431), and
  wherein a sealing element (440) comprising a circumferential groove is provided in the inner circumferential face (431) opposite a circumferential running surface (423) of the thrust bearing plate (420).

* * * * *